United States Patent
Bae (10) Patent No.: US 7,054,598 B2
(45) Date of Patent: May 30, 2006

(54) HIGH SPEED DIGITAL RECEIVED SIGNAL STRENGTH INDICATOR CIRCUIT

(75) Inventor: Jong-dae Bae, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 446 days.

(21) Appl. No.: 10/638,001

(22) Filed: Aug. 8, 2003

(65) Prior Publication Data

US 2004/0038657 A1 Feb. 26, 2004

(30) Foreign Application Priority Data

Aug. 9, 2002 (KR) ............... 2002-47228

(51) Int. Cl.
*H04B 1/18* (2006.01)

(52) U.S. Cl. ............... 455/127.2; 455/115.3; 455/232.1; 455/251.1; 455/226.2; 370/335; 370/342; 370/441

(58) Field of Classification Search ............ 455/127.2, 455/127.3, 127.4, 513, 63.1, 67.11, 67.13, 455/67.16, 550.1, 91, 95, 115.1, 115.3, 115.4, 455/138, 137, 155.1

See application file for complete search history.

(56) References Cited

U.S. PATENT DOCUMENTS

| | | | | |
|---|---|---|---|---|
| 6,067,292 | A * | 5/2000 | Huang et al. | 370/342 |
| 6,961,546 | B1 * | 11/2005 | Rofougaran et al. | 455/118 |
| 2003/0031121 | A1 * | 2/2003 | Sudo | 370/203 |
| 2005/0073944 | A1 * | 4/2005 | Rudkin | 370/204 |

* cited by examiner

*Primary Examiner*—Edward Urban
*Assistant Examiner*—Thuan T. Nguyen
(74) *Attorney, Agent, or Firm*—F. Chau & Associates, LLC (57) ABSTRACT

A high-speed digital received signal strength indicator (RSSI) circuit is provided. The high speed digital RSSI circuit includes an amplifying unit which includes a plurality of amplifiers connected in series for amplifying a received signal through multiple stages, a thermal code generating unit for generating a thermal meter code of $2^n$ bits by using a pair of output signals that are outputted from each of the amplifiers of the amplifying unit and have an inversed phase to each other, and a binary code converting unit for converting the thermal meter code of $2^n$ bits into a binary code of n+1 bits, and thus outputs the binary code as digital RSSI data for controlling the gain of the received signal

28 Claims, 7 Drawing Sheets

HIGH SPEED DIGITAL RECEIVED SIGNAL STRENGTH INDICATOR CIRCUIT

PRIORITY

This application claims priority to Korean Patent Application No. 2002-47228, filed on Aug. 9, 2002, in the Korean Intellectual Property Office.

BACKGROUND OF THE INVENTION

1. Field of the Invention

The present invention relates generally to a received signal strength indicator (RSSI) circuit, and more particularly, to a high-speed digital RSSI circuit which is capable of performing auto gain control (AGC), independently of a baseband signal processor modem, and capable of detecting the strength of a received signal at a high speed without using an external capacitor.

2. Discussion of the Related Art

Information or image signal broadcasts through air are usually transmitted at a high frequency such as frequency (RF). The RF signal is received through an antenna of a receiver. The received signal is converted into a signal of an intermediate frequency (IF) or a baseband via a low noise amplifier (LNA) and a down conversion mixer. Then, interfering signal components of the converted signal are removed using a band pass filter or a low pass filter such that only desired signal components are transmitted to an IF signal processor or a baseband signal processor. The LNA, a mixer, and an integrated filter circuit have limited dynamic range, and thus, it is necessary to control their gain and linearity according to the strength of a received signal.

The physical layer of wireless communication systems, such as code-division multiple access (CDMA) systems, global systems for mobile communication (GSM), and wireless local area networks (WLAN) etc., processes an analog baseband signal. Then, in another layer, a baseband modem converts the analog signal to digital signal and performs digital modulation and an operation according to a digital RSSI to feed back information for automatic gain control. In less elaborate systems, such as one using bluetooth technology, the modulation or RSSI operations are performed in the physical layer. In such systems, automatic gain control is performed without the baseband modem, and such gain control must be performed at high speed so that receipt of input signal is not interrupted.

Figure 1:
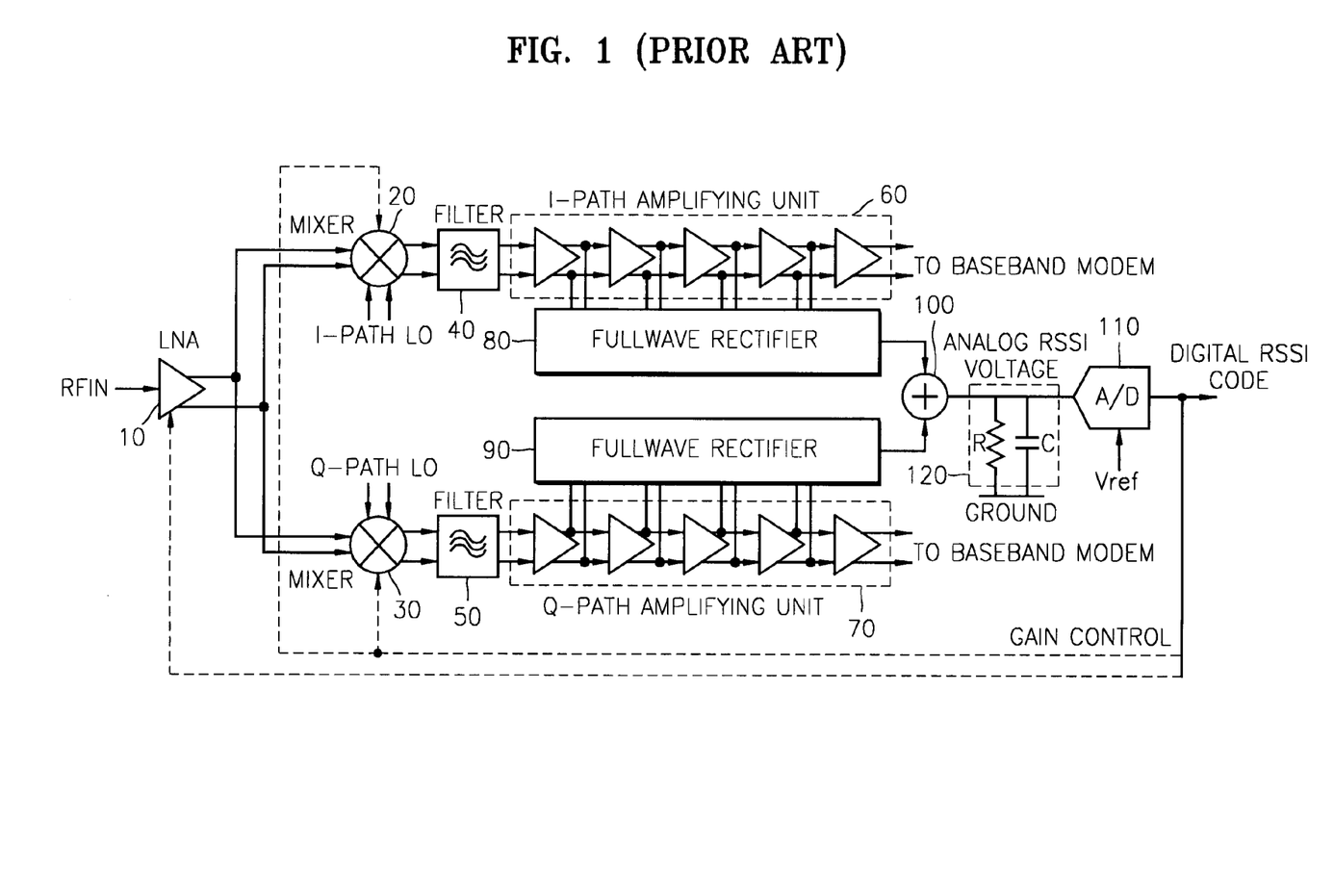
FIG. 1 is a block diagram of a conventional RSSI.

FIG. 1 is a block diagram of a conventional RSSI.

Referring to FIG. 1, the phase difference between I-Path and Q-Path is 90° Fullwave rectifiers 80 and 90 generate current by fullwave rectifying an output signal for each end of multi-stage amplifiers, e.g., limiters 60 and 70, and the generated current is summed up by an adder 100. The summed up current is converted into a voltage by an RC parallel load 120. An A/D converter 110 converts the voltage signal to a digital signal based on a reference voltage Vref and outputs the digital signal as a digital RSSI code. Gains of low noise amplifier LNA 10 and mixers 20 and 30 are controlled by the digital RSSI code.

The capacitor C of the RC parallel load 120, which is used to smooth-over ripples occurring when the output signal is fullwave-rectified, is usually placed outside an integrated circuit, and a large capacitor is required. However, as the capacitance of the capacitor C increases, the time required to charge up the capacitor increased, and thus, a RSSI response time, e.g., the time required to generate the digital RSSI code and control the gains of the LNA 10 and the mixers 20 and 30 according to the generated RSSI code, is also increased. In other words, there is a trade off between an increase in the capacitance of the capacitor C and an increase in the RSSI response time.

FIGS. 2A through 2D illustrate graphs of digital RSSI data generated when a time division duplex (TDD) communication system receives a signal.

Figure 2A:
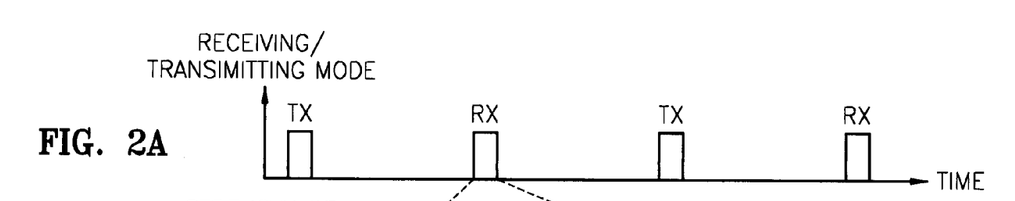
FIGS. 2A through 2D are graphs of digital RSSI data generated when a time division duplex (TDD) communication system receives a signal.

As shown in FIG. 2A, the TDD communication system, where the frequency of a received signal is the same as that of a transmitted signal, divides one frame into a channel for transmitting and a channel for receiving to enable two-way communication with one channel frequency.

Figure 2B:
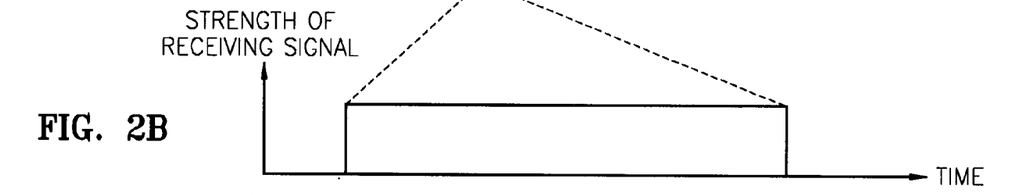
Figures 2C, 2D:
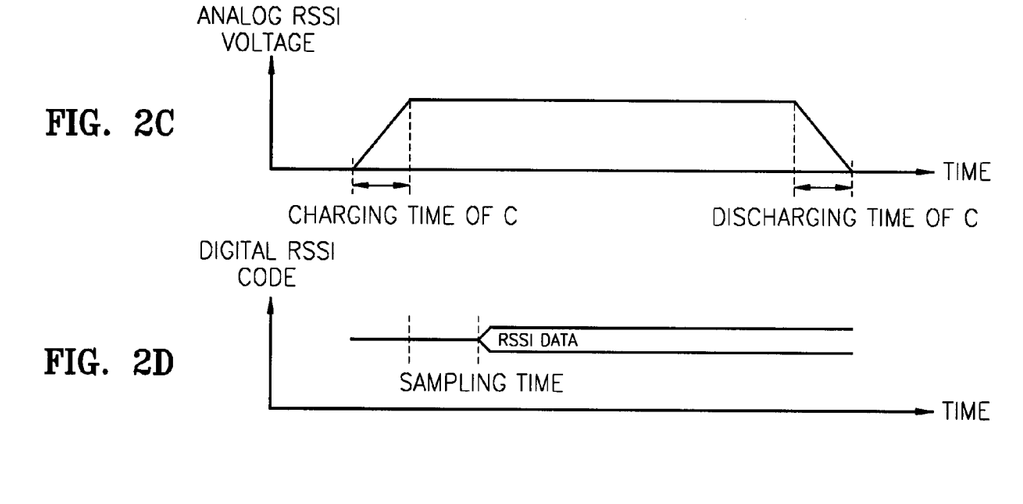

FIG. 2B shows an enlarged view of one pulse of the received signal of FIG. 2A and FIG. 2C is a graph of the received signal of FIG. 2B converted into a voltage signal by the RC parallel load 120. Referring to FIG. 2C, the delay in converting an input signal RXIN into a voltage signal increases in proportion to the time required for the capacitor C of the RC parallel load 120 to charge.

FIG. 2D shows the voltage signal which is shown in FIG. 2C converted into digital RSSI data by the A/D converter 110. Referring to FIG. 2D, a delay in generating the digital RSSI data increases in proportion to the sampling time required for digital conversion in the A/D converter 110.

When the digital RSSI data are generated by using the RC parallel load 120 and the A/D converter 110, the delay in generating the digital RSSI data occurs in proportion to the time required for the capacitor C of the RC parallel load 120 to charge and the sampling time required for digital conversion in the A/D converter 110. Accordingly, the time required for controlling the gains of the LNA 10 and the mixers 20 and 30 according to the digital RSSI data is expected to be prolonged.

In addition, the A/D converter 110 requires a reference voltage Vref in converting the inputted signal into a digital signal. It can be seen that the accuracy of the Vref significantly affects accuracy of the digital RSSI data. Therefore, an accurate reference voltage Vref is needed to provide accurate RSSI date. However, as in known in the art, different Vrefs can result due to variations in changes due to manufacturing processes. As a result, the accuracy of the digital RSSI data will likewise vary.

Figure 3:
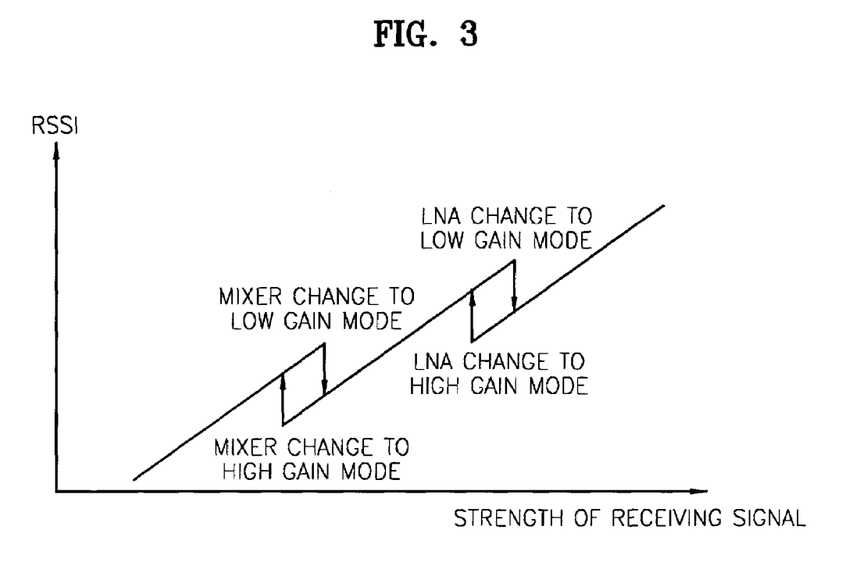
FIG. 3 is graph showing the characteristics of RSSI data outputted from the system of FIG. 1.

FIG. 3 is a graph showing characteristics of RSSI data outputted from the system of FIG. 1.

Referring to FIG. 3, when the strength of the received signal is small, the gain of the mixer 20 is controlled by the RSSI data. When the strength of the received signal is large, the gain of the LNA 10 is controlled by the RSSI data to control the strength of the received signal. Here, when the gain of the LNA or the mixers is changed from a low level to a high level or from a high level to a low level, appropriate hysterisis is needed to remove instability.

SUMMARY OF THE INVENTION

A high speed digital received signal strength indicator (RSSI) circuit according to the embodiments of the present invention is capable of performing auto gain control independently of operations a baseband signal processor modem, and is capable of detecting the strength of a received signal at high speed without using an external capacitor.

A receiver can stably receive a signal from a communication system by using a high-speed digital RSSI circuit according to embodiments of the present invention.

According to an aspect of the present invention, there is provided an RSSI circuit for controlling the gain of a received signal in a receiving device of a communication system comprising an amplifying unit including a plurality of amplifiers connected in series for amplifying the received signal through multiple stages; a thermal code generating unit for generating a thermal meter code of $2^n$ bits by using a pair of output signals that are outputted from each of the amplifiers of the amplifying unit and have an inversed phase to each other; and a binary code converting unit for converting the thermal meter code of $2^n$ bits into a binary code of n+1 bits and outputting the binary code as digital RSSI data for controlling the gain of the received signal.

A RSSI circuit for controlling a gain of a received signal in a receiving device of a communication system comprising an I-Path amplifying unit including a plurality of amplifiers connected in series for amplifying an inputted I-Path signal through multiple stages; an I-Path thermal code generating unit for generating a thermal meter code of $2^n$ bits by using a pair of output signals that are outputted from each of the amplifiers of the I-Path amplifying unit and having an inversed phase to each other; a Q-Path amplifying unit including a plurality of amplifiers connected in series for amplifying an inputted Q-Path signal, which has a phase contrast of 90° to the I-Path signal, through multiple stages; a Q-Path thermal code generating unit for generating a thermal meter code of $2^n$ bits by using a pair of output signals that are outputted from each of the amplifiers of the Q-Path amplifying unit and having an inversed phase to each other; and a binary code converting unit which combines the thermal meter codes of $2^n$ bits of the I-Path code generating unit and those of the Q-Path code generating unit, generates a thermal meter code of $2^{n+1}$ bits, converts the thermal meter code of $2^{n+1}$ bits into a binary code of (n+1) bits, and thus outputs the binary code as digital RSSI data for controlling the gain of the received signal.

According to another aspect of the present invention, there is provided a receiving device of a communication system comprising an amplifier which inputs a received signal and amplifies the received signal with a gain controlled by RSSI data; a first mixer for mixing the amplified signal, which is amplified by the amplifier, with a first local oscillating signal to convert the amplified signal into an I-Path signal of a baseband signal to be output, a gain of the first mixer being controlled by the RSSI data; a second mixer for mixing the amplified received signal, which is amplified by the amplifier, with a second local oscillating signal, which has a phase contrast of 90° to the I-Path signal, and outputs a Q-Path signal, which has a phase contrast of 90° to the I-Path signal and is converted into a signal of a baseband, a gain of the second mixer being controlled by the RSSI data in the same gain as the first mixer; a first filter and a second filter for removing interfering components of the I-Path signal and Q-Path signal; and a RSSI circuit for generating a thermal meter code of $2^{n+1}$ using the I-Path signal and the Q-Path signal, which interfering components are removed, converting the generated thermal meter codes into a binary code of (n+1) bits, and generating the binary code as the RSSI data.

A receiving device of a communication system comprising an amplifier which inputs a received signal and amplifies the received signal with a gain which is controlled by RSSI data; a mixer for mixing the amplified signal, which is amplified by the amplifier, with a first local oscillating signal to convert the amplified signal into a signal of a baseband, a gain of the mixer being controlled by the RSSI data; a filter for removing interfering components of the inputted mixed signal; and an RSSI circuit for generating a thermal meter code of $2^n$ using the mixed signal, which interfering components are removed, converting the generated thermal meter code into a binary code of n bits, and generating the binary code as the RSSI data.

BRIEF DESCRIPTION OF THE DRAWINGS

The above aspects and advantages of the present invention will become more apparent by describing in detail preferred embodiments thereof with reference to the attached drawings in which.

DETAILED DESCRIPTION OF PREFERRED EMBODIMENTS

The present invention now will be described more fully with reference to the accompanying drawings, in which preferred embodiments of the invention are shown.

Figure 4:
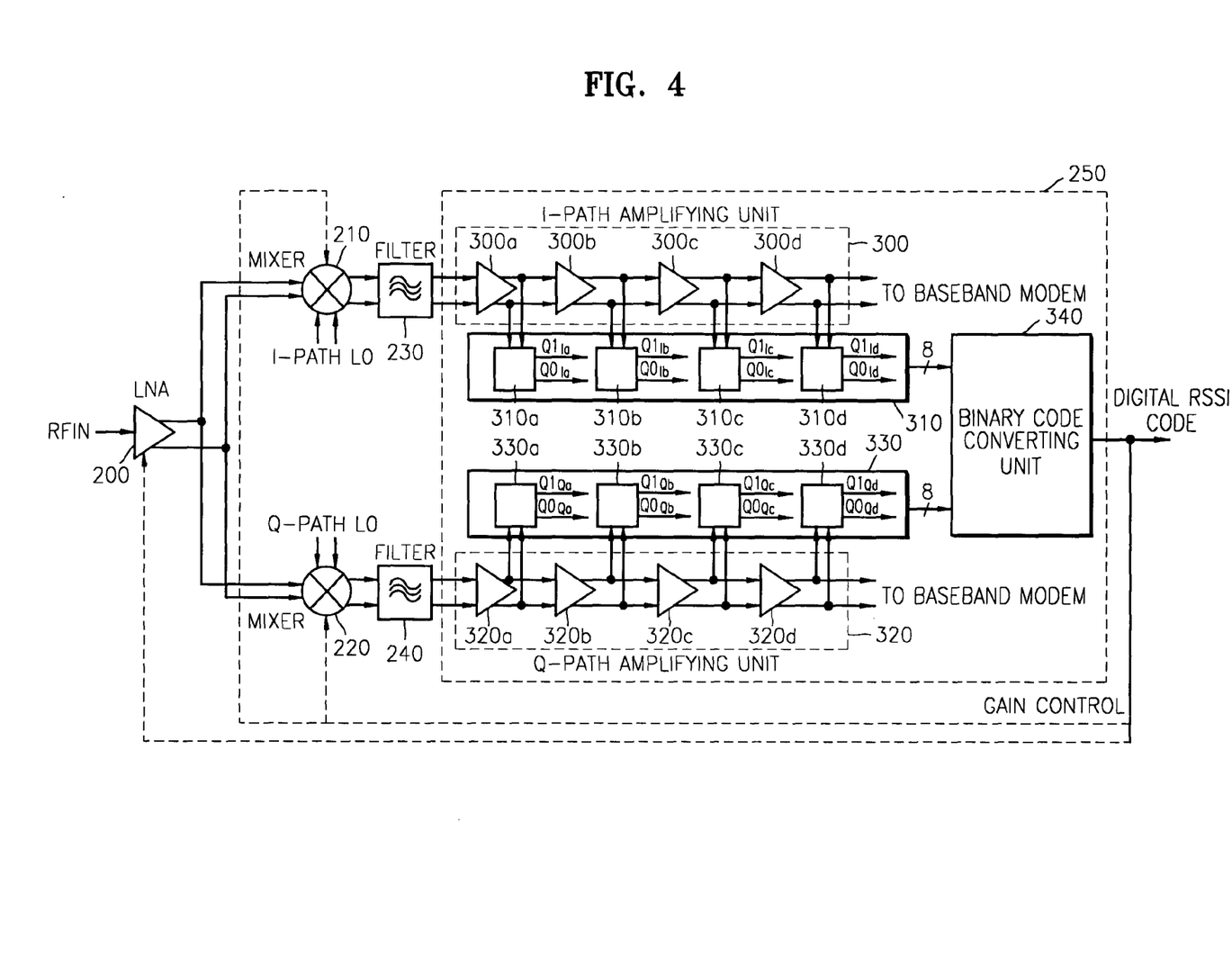
FIG. 4 is a block diagram of a high speed digital RSSI circuit according to an embodiment of the present invention.

FIG. 4 is a block diagram of a high speed digital RSSI circuit 250 according to an embodiment of the present invention. The high speed digital RSSI circuit 250 according to an embodiment of the present invention is comprised of an I-Path amplifying unit 300, an I-Path thermal code generating unit 310, a Q-Path amplifying unit 320, a Q-Path thermal code generating unit 330, and a binary code converting unit 340. A low noise amplifier (LNA) 200, a first mixer 210, a second mixer 220, a first filter 230 and, a second filter 240 are also illustrated in FIG. 4.

Referring to FIG. 4, the LNA 200 amplifies a received signal RFIN. In particular, the LNA 200 is an amplifier, which is designed to lessen noises generated during amplification, and its gain is controlled by the RSSI data outputted from the high-speed digital RSSI circuit 250. The first mixer 210 mixes the output signal of the LNA 200 with an I-Path local oscillating signal I-LO to convert the output signal of the LNA 200 into an I-signal of a baseband. In addition, the second mixer 220 mixes the output signal of the LNA 200 with an Q-Path local oscillating signal Q-LO to convert the output signal of the LNA 200 into an Q-signal of the baseband. Here, the phase contrast between the I-LO and the Q-LO is equal to 90°, and thus, the phase contrast between the I-signal and the Q-signal, which are outputted from the first mixer 210 and the second mixer 220, respectively, is equal to 90°. Gains of the first mixer 210 and the second mixer 220 are controlled by the RSSI data outputted from the RSSI circuit 250.

The first filter 230 and the second filter 240 may be a band pass filter or a low pass filter for removing interfering components by filtering the I-signal and the Q-signal, respectively.

The RSSI circuit 250 receives the I-signal and the Q-signal, of which interfering components are filtered by the first filter 230 and the second filter 240, and generates a $2^{n+1}$ thermal meter code from the received I-signal and the Q-signal. Then, the RSSI circuit 250 converts the generated $2^{n+1}$ thermal meter code into a binary code of (n+1) bits and generates the binary code of (n+1) bits as RSSI data. As described above, the RSSI circuit 250 is composed of the I-Path amplifying unit 300, the I-Path thermal code generating unit 310, the Q-Path amplifying unit 320, the Q-Path thermal code generating unit 330, and the binary code converting unit 340.

The I-Path amplifying unit 300 amplifies the I-signal, which is filtered by the first filter 230, through multiple stages. For illustrative purposes, it is assumed that the I-Path amplifying unit 300 comprises of four amplifiers 300a through 300d. Pairs of signals, which are outputted from the amplifier at each stage, are signals where one signal of a pair is 180° out of phase from the other signal.

The I-Path thermal code-generating unit 310 generates the thermal meter code of n bits by using the pairs of signals outputted from the amplifiers 300a through 300d. For illustrative purposes, it is assumed that the I-Path thermal code-generating unit 310 generates a thermal meter code of 2 bits per pair of signals outputted from the amplifiers 300a through 300d. Based on this assumption, the I-Path thermal code-generating unit 310 generates a thermal meter code of 8 bits for the pairs of signals outputted from the amplifiers 300a through 300d. The I-Path thermal code-generating unit 310 comprises of four code generators 310a through 310d. Each of the code generators 310a through 310d generates a thermal meter code of 2 bits by using the pairs of signals respectively outputted from the amplifiers 300a through 300d. Here, the thermal meter code toward the code generator 310d is at a lower level than the thermal meter code toward the code generator 310a.

The Q-Path amplifying unit 320 amplifies the Q-signal, which is filtered by the second filter 240, through multi stages. For illustrative purposes, it is assumed that the Q-Path amplifying unit 320 comprises four amplifiers, similarly to the I-Path amplifying unit 300. Pairs of signals, which are outputted from the amplifier at each stage, are signals where one signal of a pair is 180° out of phase from the other signal.

The Q-Path thermal code-generating unit 330 generates a thermal meter code of n bits by using the pairs of signals, which are outputted from the amplifiers of the Q-Path amplifying unit 320. For illustrative purposes, it is assumed that the Q-Path thermal code-generating unit 330 generates the thermal meter code of 2 bits for the pair of signals outputted from each amplifier. Based on this assumption, the Q-Path thermal code-generating unit 330 generates the thermal meter code of 8 bits for the pairs of signals, which are outputted from the amplifiers 320a through 320d. The Q-Path thermal code-generating unit 310 is comprised of four code generators 330a through 330d. Each code generator generates a thermal meter code of 2 bits by using the pairs of signals respectively outputted from the amplifiers 320a through 320d. Here, the thermal meter code toward the code generator 330d is at a lower level than the thermal meter code of toward the code generator 330a.

The binary code converting unit 340 combines the thermal meter codes of 8 bits, which are generated from the I-Path thermal code generating unit 300 and the Q-Path thermal code generating unit 330, generates a thermal meter code of 16 bits, and then converts this thermal meter code of 16 bits into a binary code of 4 bits. The binary code converting unit 340 outputs the binary code of 4 bits as the digital RSSI data. More specifically, the binary code converting unit 340 combines the thermal meter codes, which are generated from the code generators 310a and 330a, and generates an upper thermal meter code of 4 bits. In addition, the binary code converting unit 340 combines the thermal meter codes generated from the code generators 310b and 330b, combines the thermal meter codes generated from the code generators 310c and 330c, and thus, generates a middle thermal meter code of 8 bits for the respective combination. Then, the binary code-converting unit 340 combines the thermal meter codes generated from the code generators 310d and 330d, and generates a lower thermal meter code of 4 bits.

As described above, since an RSSI circuit according to the present invention does not use an additional capacitor placed on the outside of an integrated circuit and the A/D converter, it is possible to operate the RSSI circuit at high speed without needing extra time for charging the capacitor or delaying the response of the RSSI due to the time required for sampling by the A/D converter.

Figure 5:
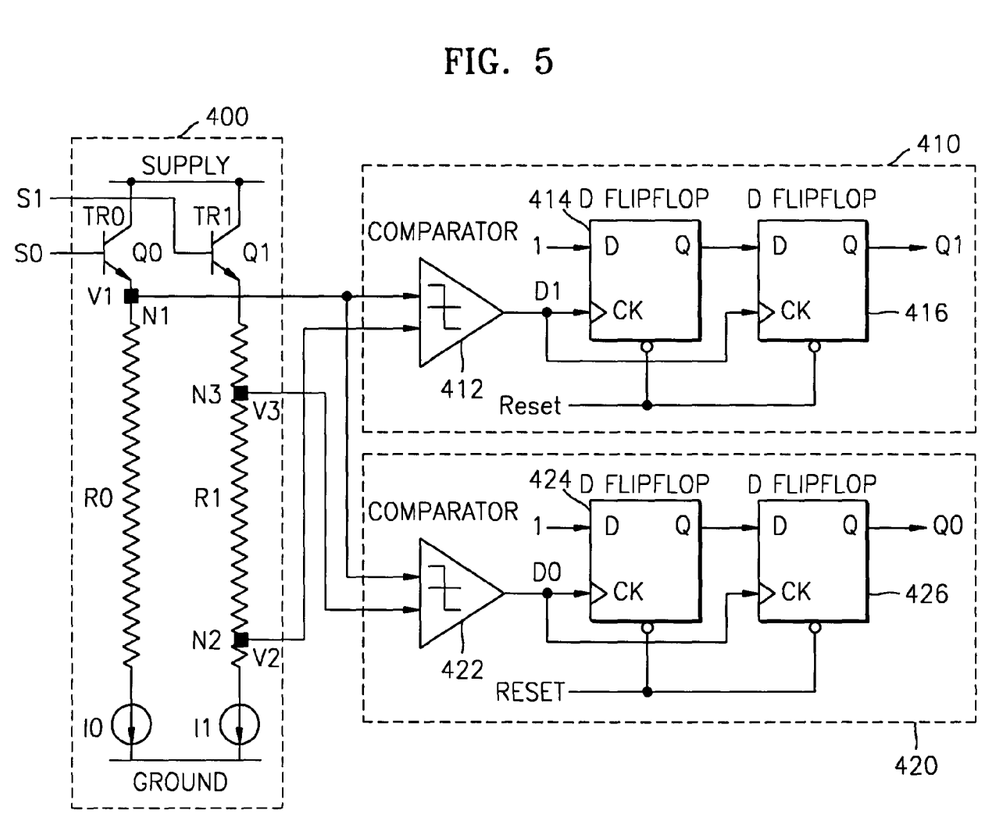
FIG. 5 is a block diagram of a code generator of code generators 310a–310d and 330a–330d of FIG. 4.

FIG. 5 is a block diagram of a code generator of code generators 310a–310d and 330a–330d of FIG. 4. The code generator according to an embodiment of the present invention includes a comparison signal generating unit 400, a first thermal code generator 410 and a second thermal code generator 420. For illustrative purposes, it is assumed that FIG. 5 is one embodiment of the code generator 310a.

Referring to FIG. 5, the comparison signal-generating unit 400 internally generates a voltage signal to be compared with a pair of signals S1 and S0 outputted from the amplifier 300a and outputs the voltage signal with the pair of signals. More specifically, the comparison signal-generating unit 400 includes a first transistor TR0, a second transistor TR1, an array of resistors R0 and R1, and current sources I0 and I1.

Signals S0 and S1 are connected to bases of the first and second transistors TR0 and TR1, respectively, in the comparison signal generating unit 400. A collector is connected to a voltage source SUPPLY, and emitters are connected to the array of resistors R0 and R1, respectively, at one end. The other end of the resistors R0 and R1 is respectively connected to the current sources I0 and I1.

The comparison signal generating unit 400 outputs a first voltage signal V1 (=signal S0) which is generated at a first node N1, a second voltage signal V2 which is generated at a second node N2, and a third voltage signal V3 which is generated at a third node N3, to the first thermal code generating unit 410 and the second thermal code generating unit 420.

The first thermal code generating unit 410 generates the upper thermal meter code Q1 at a high level in the thermal meter code of 2 bits by using the first and second voltage signals V1 (=signal S0) and V2 which are outputted from the comparison signal generating unit 400. The first thermal meter code generating unit 410 includes a first comparator 412, a first flip-flop 414, and a second flip-flop 416.

The first comparator 412 compares the first voltage signal V1 (=signal S0) generated at the first node N1 of the comparison signal generating unit 400 with the second voltage signal V2 generated at the second node N2 of the comparison signal generating unit 400 and outputs the comparison result to a clock input CK of the first flip-flop 414.

The first flip-flop 414 is reset by a reset signal Reset, inputs the comparison result outputted from the first comparator 412 to the clock input CK, and inputs a high level data to data input D, respectively. The first flip-flop 414 outputs the high level data "1", which was inputted to the data input D, to data output Q in response to the comparison result of the first comparator 412, which is inputted to the clock input CK. Here, the reset signal Reset is generated in response to the input of the received signal RFIN in FIG. 4.

The second flip-flop 416 is reset by the reset signal Reset, inputs the comparison result outputted from the first comparator 412 to the clock input CK, and inputs the output data of the first flip-flop 414 to data input D, respectively. The second flip-flop 416 outputs the data inputted to the data input D as the upper thermal meter code Q1 in the thermal meter code of 2 bits in response to the comparison result of the first comparator 412, which is inputted to the clock input CK.

The second thermal code generator 420 generates a lower thermal meter code Q0 in the thermal meter code of 2 bits by using the first and third voltage signals V1 and V3 outputted from the comparison signal-generating unit 400. The second thermal code generating unit 420 includes a second comparator 422, a third flip-flop 424, and a fourth flip-flop 426, and performs the same operations as those of the first comparator 412, the first flip-flop 414, and the second flip-flop 416 corresponding to the first thermal code generating unit 410.

If the signals outputted from the first comparators 412 and 422 are clocked at a high level for more than two clock cycles, the two flip-flops of the first thermal code generating unit 410 and the second thermal code generating unit 420 go to a high level. Once the flip-flops go to the high level, they do not change to a low level until a next received signal RXIN is inputted, which would reset the flip-flops. This means that the RSSI circuit according to an embodiment of the present invention operates for an initial short period of time rather than continuously operating during a RX time. Thus, the hysterisis of the RSSI is not required when the RSSI circuit is combined with an automatic auto gain controller in a receiving device and the nonlinearity can be removed.

The second and third voltage signals V2 and V3 of FIG. 5 are required to be controlled such that a bubble is not generated when the thermal meter codes are generated. This is further described with reference to Table 1 below.

If a maximum value of an input signal is 256 mV, a thermal meter code of 16 bits can be easily generated for the input signal by using sixteen comparators. Here, input signals are inputted to one input of each comparator and reference voltages are inputted to the other input of each comparator. The reference voltages are 256 mV (=256 mV/$2^0$), 128 mV (=256 mV/$2^1$), 64 mV (=256 mV/$2^2$), . . . , 15.6 μV (=256 mV/$2^{14}$), 7.8125 μV (=256 mV/$2^{15}$), and each of them is inputted to a corresponding comparator of the sixteen comparators. However, when the thermal meter codes are generated like this, each comparator is required to have high resolution, and therefore, the resulting circuit is very complex. In addition, the circuit becomes more complex as the number of bits of the thermal meter code increases, a fact which makes it difficult to fabricate the circuit. To overcome these problems, an upper thermal meter code of 4 bits is generated by using signals outputted from the first amplifiers 300a and 320a. The second through fourth amplifiers 300b through 300d and 320b through 320d amplify signals outputted from a previous amplifier and generate thermal meter codes by using amplified signals. By amplifying signals to be compared, the resolution of the comparator of the code generators does not matter. In addition, there is the amplifier in a conventional receiving device and thus, the RSSI circuit according to the present invention can be easily achieved by using the amplifiers.

When a plurality of amplifiers are used to generate the thermal meter codes, a difference between the voltages of two signals inputted to the comparators 412 and 422 of the code generators has to be controlled based on gains of the amplifiers, so as to generate the thermal meter code without the bubble. The following Table 1 shows an example of a DC voltage difference Vsub between pairs of signals, which are inputted to amplifiers from the code generators 310a through 310d and 330a through 330d, and comparison voltage signals which are generated within the amplifiers, such that the code generators 310a through 310d and 330a through 330d of FIG. 4 can generate the thermal meter codes of 2 bits without the bubble.

In the following Table 1, A1 denotes gains of the amplifiers 310a and 330a, A2 denotes gains of the amplifiers 310b and 330b, and A3 denotes gains of the amplifiers 310c and 330c.

TABLE 1

| Position of Comparator | Vsub |
|---|---|
| First comparator of Code generator 310a | 256 mV |
| First comparator of Code generator 330a | 128 mV |
| Second comparator of Code generator 310a | 64 mV |
| Second comparator of Code generator 330a | 32 mV |
| First comparator of Code generator 310b | A1 × 16 mV |
| First comparator of Code generator 330b | A1 × 8 mV |
| Second comparator of Code generator 310b | A1 × 4 mV |
| Second comparator of Code generator 330b | A1 × 2 mV |
| First comparator of Code generator 310c | A1 × A2 × 1 mV |
| First comparator of Code generator 330c | A1 × A2 × 500 μV |
| Second comparator of Code generator 310c | A1 × A2 × 250 μV |
| Second comparator of Code generator 330c | A1 × A2 × 125 μV |
| First comparator of Code generator 310d | A1 × A2 × A3 × 62.5 μV |
| First comparator of Code generator 330d | A1 × A2 × A3 × 31.25 μV |
| Second comparator of Code generator 310d | A1 × A2 × A3 × 15.625 μV |
| Second comparator of Code generator 330d | A1 × A2 × A3 × 7.8125 μV |

As described above, when the DC voltage difference Vsub is set, the thermal meter codes of 16 bits, which are combined in the binary code generating unit 340, are $Q1_{Ia}$, $Q1_{Qa}$, $Q0_{Ia}$, $Q0_{Qa}$, $Q1_{Ib}$, $Q1_{Qb}$, $Q0_{Ib}$, $Q0_{Qb}$, $Q1_{Ic}$, $Q1_{Qc}$, $Q0_{Ic}$, $Q0_{Qc}$, $Q1_{Id}$, $Q1_{Qd}$, $Q0_{Id}$, and $Q0_{Qd}$. However, the thermal meter codes can be combined, differently from the above Table 1, according to the DC voltage difference Vsub in the binary code converting unit 340.

In addition, the resistance and current of the comparison voltage generating unit 400 of FIG. 5 are set appropriately, and positions of the nodes N2 and N3 are selected appropriately, so as to obtain the Vsub of Table 1, which denotes the difference of the DC levels between the signals inputted to the comparators 412 and 422.

The comparison voltage shown in Table 1 is an example where its tilt is LSB/6 dB. That is, if an input signal increases by 6 dB, e.g., two times, the RSSI code increases by 1 LSB. Here, the dynamic range of the RSSI becomes 15×6 dB (=90 dB). If it is necessary to reduce the tilt of the RSSI, the comparison voltage has to be changed. For example, if the tilt is LSB/3 dB (=$\sqrt{2}$), the comparison voltage of Table 1 changes into that of the following Table 2.

TABLE 2

| Position of Comparator | Vsub |
|---|---|
| First comparator of Code generator 310a | 256 mV |
| First comparator of Code generator 330a | 181 mV |
| Second comparator of Code generator 310a | 128 mV |
| Second comparator of Code generator 330a | 90.5 mV |
| First comparator of Code generator 310b | A1 × 64 mV |
| First comparator of Code generator 330b | A1 × 45.25 mV |
| . | . |
| . | . |
| . | . |
| Second comparator of Code generator 310d | A1 × A2 × A3 × 2 mV |
| Second comparator of Code generator 330d | A1 × A2 × A3 × 1.414 mV |

If the comparison voltage Vsub is set as shown in Table. 2, the RSSI becomes more complex while the dynamic range of the RSSI decreases to 15×3 dB (=45 dB). Here, to increase the dynamic range of the RSSI, the number of bits of the thermal meter code must be increased. The number of bits of the thermal meter code can increase the number of amplifiers of the I-Path amplifying unit 300 and the Q-Path amplifying unit 320 of FIG. 4 or the number of thermal code generating units of FIG. 5. Typically, the number of amplifiers of the amplifying unit is fixed previously. Consequently, it is desirable to increase the number of the thermal code generators.

Therefore, the number of the thermal code generators and the DC voltage difference Vsub of the signals inputted to the comparator are related to the tilt of the RSSI, the dynamic range of the RSSI, a maximum value and a minimum value of the received input signal and gains of the amplifiers. Here, the comparison voltage is calculated with reference to the minimum value of the input signals or the maximum value of the input signals. In addition, the gain of the amplifier in the receiving device is determined by a request of the receiving device rather the RSSI, and the gain is usually 6 dB-24 dB.

The tilt is calculated by following formula 1 to determine the number of bits of the RSSI, and then the comparison voltage can be determined.

$$\frac{Max - Min}{R_S}, \tag{1}$$

where $R_S$ is a required resolution and Max and Min are the maximum and minimum values of the received input signal.

Figure 6A:
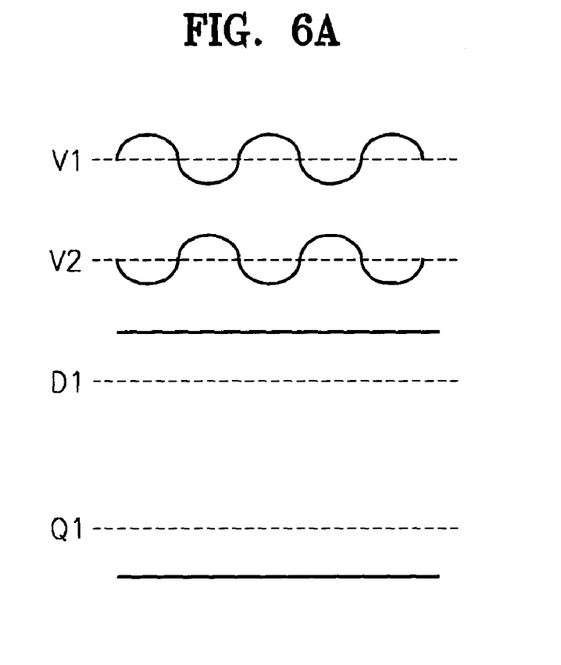
FIGS. 6A and 6B illustrate waveforms of each element when input signals are different from one another in the code generators of FIG. 5.
Figure 6B:
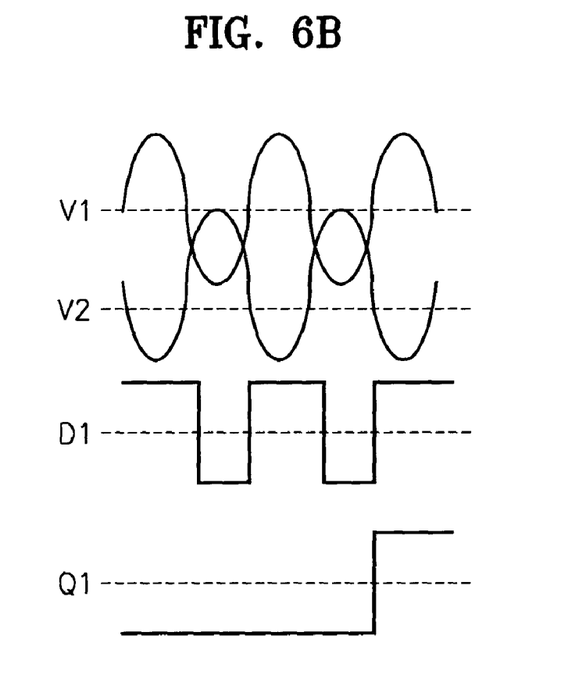

FIGS. 6A and 6B are waveforms of each element when the magnitudes of input signals which are inputted to the code generators of FIG. 5 are different from one another.

FIG. 6A shows an example of waveforms when the circuit of FIG. 5 is the code generator 310a. Referring to FIG. 6A, the phase of the first and second voltage signals V1 and V2, which are inputted to the comparator 412, are the reverse of each other, and their DC levels are different from each other through the node N2. As shown in FIG. 6A, if $V_{P-P}$ of the first and second voltage signals V1 and V2 is small, the output Q1 of the second flip-flop 416 goes to low level 0 in response to a signal D1 which is outputted from the comparator 412. Whereas, FIG. 6B shows an example of waveforms when the circuit of FIG. 5 is the code generator 310d. Referring to FIG. 6B, the phase of the first and second voltage signals V1 and V2, which are inputted to the comparator 412, are the reverse of each other, and their DC levels are different from each other through the node N2. If $V_{P-P}$ of the voltage signals V1 and V2 is large, the output Q1 of the second flip-flop 416 goes to high level 1 in response to a signal D1 outputted from the comparator 412.

Figure 7:
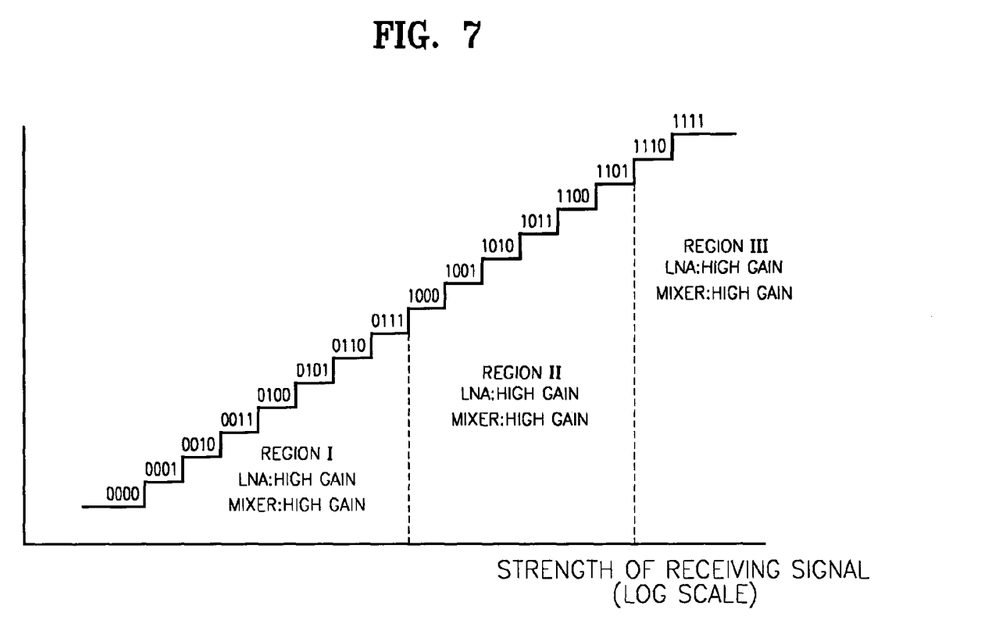
FIG. 7 is a graph of setting characteristics of RSSI circuit operation according to an embodiment of the present invention.

FIG. 7 is a view of setting characteristics of RSSI circuit operation according to an embodiment of the present invention.

Referring to FIGS. 4 and 7, the dynamic regions of the LNA 200, a first mixer 210 and a second mixer 220 according to the RSSI data can be set as Regions I, II, III. In Region I, the LNA 200 and the first and the second mixers 210 and 220 are set as a high gain mode. In Region II, the LNA 200 is set as the high gain mode, while the first and the second mixers 210 and 220 are set as a low gain mode. In Region III, the LNA 200 and the first and the second mixers 210 and 220 are set as the low gain mode. Generally, the LNA 200, the first and the second mixers 210 and 220 are set as the high gain mode before the received signal RXIN is inputted, and then if the received signal RXIN starts being received, the RSSI circuit 250 operates to set appropriate regions of the LNA 200 and the first and the second mixers 210 and 220. Here, if the received signal RXIN for Region II is inputted, the first and the second mixers 210 and 220, which are set as the high gain mode initially, are changed into the low gain mode, and thus the signals inputted to I-Path amplifying unit 300 and the Q-Path amplifying unit 320 decreases. According to the characteristics of the circuit of FIG. 5, once the thermal meter code for the received signal RXIN is set, the value of the thermal meter code does not change until a reset signal Reset is generated, namely until the next received signal RXIN is inputted. Therefore, the first mixer 210 and the second mixer 220 do not change repeatedly from low to high or vice versa. This is useful for controlling the level of a transmission output by the RSSI.

As described above, since the high speed digital RSSI circuit according to embodiments of the present invention does not use an additional capacitor placed on the outside of the RSSI circuit and an A/D converter, it is possible to operate the RSSI circuit at high speed without needing extra time for charging the capacitor or delaying in the response of the RSSI due to the sampling time of the A/D converter. The RSSI circuit according to embodiments of the present invention operates for an initial short period of time rather than continuously operating during a RX time. Thus, the hysteresis of the RSSI is not required when the RSSI circuit is combined with an auto gain controller in a receiving device, and nonlinearity can be removed.

While this invention has been particularly shown and described with reference to preferred embodiments thereof, it will be understood by those skilled in the art that various changes in form and details may be made therein without departing from the spirit and scope of the invention as defined by the appended claims and equivalents.

What is claimed is:

1. A received signal strength indicator (RSSI) circuit for controlling a gain of a received signal in a receiving device of a communication system, the RSSI circuit comprising:
    an amplifying unit including a plurality of cascaded amplifiers for amplifying the received signal;
    a thermal code generating unit for generating a thermal meter code of $2^n$ bits by using a pair of output signals that are outputted from each of the amplifiers of the amplifying unit and having an inversed phase to each other; and
    a binary code converting unit for converting the thermal meter code of $2^n$ bits into a binary code of n+1 bits and outputting the binary code as digital RSSI data for controlling the gain of the received signal.

2. The RSSI circuit of claim 1, wherein the thermal code generating unit includes a plurality of code generators which correspond to each of the pair of output signals and generates a thermal meter code of m bits (<n) when the corresponding pair of output signals are inputted.

3. The RSSI circuit of claim 2, wherein each of the code generators comprises:
a comparison signal generating unit for generating comparison voltage signals which are to be compared with the corresponding pair of output signals and have first through $m^{th}$ DC voltage differences with respect to the corresponding pair of output signals; and
m number of thermal code generators which correspond to each of the comparison voltage signals and generate a thermal code of n-bits by comparing a corresponding comparison voltage signal with the one of the corresponding pair of output signals.

4. The RSSI circuit of claim 3, wherein the comparison signal generating unit comprises:
a first transistor and a second transistor which include a base, which is connected to each output signal of the corresponding pair of output signals, and a collector, which is connected to a supply voltage;
a first array of resistors and a second array of resistors which have one end connected to emitters of the first transistor and the second transistor, respectively; and
a first current source and a second current source which are respectively connected between the other end of the first and the second arrays of resistors and a ground voltage,
wherein the output signal is obtained from the emitter of the first transistor, and the m number of comparison voltage signals are obtained from the second array of resistors.

5. The RSSI circuit of claim 3, wherein each of the thermal code generators comprises:
a comparator for comparing a voltage difference between the output signal, which is the one of the corresponding pair of output signals, and the corresponding comparison voltage signal and outputs a comparison result as a clock signal; and
a flip-flop unit which is reset according to a reset signal, receives input data of a high logic level, and latches the input data as the thermal meter code of n bits in response to the clock signal.

6. The RSSI circuit of claim 5, wherein the flip-flop unit is comprised of a plurality of flip-flops which are connected in series and is reset in response to the reset signal and latches data in response to the clock signal.

7. The RSSI circuit of claim 5, wherein the reset signal is enabled in response to the input of the received signal.

8. A RSSI circuit for controlling a gain of a received signal in a receiving device of a communication system, the RSSI circuit comprising:
an I-Path amplifying unit including a plurality of amplifiers connected in series for amplifying an inputted I-Path signal through multiple stages;
an I-Path thermal code generating unit for generating a thermal meter code of $2^n$ bits by using a pair of output signals that are outputted from each of the amplifiers of the I-Path amplifying unit and having an inversed phase to each other;
a Q-Path amplifying unit including a plurality of amplifiers connected in series for amplifying an inputted Q-Path signal, which has a phase contrast of 90° to the I-Path signal, through multiple stages;
a Q-Path thermal code generating unit for generating a thermal meter code of $2^n$ bits by using a pair of output signals that are outputted from each of the amplifiers of the Q-Path amplifying unit and having an inversed phase to each other; and
a binary code converting unit which combines the thermal meter codes of $2^n$ bits of the I-Path code generating unit and the thermal meter codes of $2^n$ bits of the Q-Path code generating unit, generates a thermal meter code of $2^{n+1}$ bits, converts the thermal meter code of $2^{n+1}$ bits into a binary code of (n+1) bits, and outputs the binary code as digital RSSI data for controlling the gain of the received signal.

9. The RSSI circuit of claim 8, wherein the I-Path thermal code generating unit comprises a plurality of code generators which correspond to each pair of signals outputted from each of the amplifiers of the I-Path amplifying unit and generate thermal meter codes of m bits (<n) by inputting corresponding pair of output signals, and wherein the Q-Path thermal code generating unit comprises a plurality of code generators which correspond to each pair of signals outputted from each of the Q-Path amplifiers of the amplifying unit and generate thermal meter code of m bits (<n) by inputting corresponding pair of output signals.

10. The RSSI circuit of claim 9, wherein each of the code generators of the I-Path thermal code generating unit and the Q-Path thermal code generating unit comprises:
a comparison signal generating unit for generating comparison voltage signals which are to be compared with the corresponding pair of output signals and have first through $m^{th}$ DC voltage differences with respect to the corresponding pair of output signals; and
m number of thermal code generators which correspond to each of the comparison voltage signals and generate a thermal code of n-bits by comparing a corresponding comparison voltage signal with the one of the corresponding pair of output signals.

11. The RSSI circuit of claim 10, wherein the comparison signal generating unit comprises:
a first transistor and a second transistor which include a base, which is connected to each output signal of the corresponding pair of output signals, and a collector, which is connected to a supply voltage;
a first array of resistors and a second array of resistors which have one end connected to emitters of the first transistor and the second transistor, respectively; and
a first current source and a second current source which are respectively connected between the other end of the first and the second arrays of resistors and a ground voltage,
wherein the output signal is obtained from the emitter of the first transistor, and the m number of comparison voltage signals are obtained from the second array of resistors.

12. The RSSI circuit of claim 10, wherein each of the thermal code generators comprises:
a comparator for comparing a voltage difference between the output signal, which is the one of the corresponding pair of output signals, and the corresponding comparison voltage signal and outputs a comparison result as a clock signal; and
a flip-flop unit which is reset according to a reset signal, receives input data of a high logic level, and latches the input data as the thermal meter code of n bits in response to the clock signal.

13. The RSSI circuit of claim 12, wherein the flip-flop unit is comprised of a plurality of flip-flops which are connected in series and is reset in response to the reset signal and latches data in response to the clock signal.

14. The RSSI circuit of claim 12, wherein the reset signal is enabled in response to the input of the received signal.

15. A receiving device of a communication system comprising:
   an amplifier which inputs a received signal and amplifies the received signal with a gain controlled by RSSI data;
   a first mixer for mixing the amplified signal, which is amplified by the amplifier, with a first local oscillating signal to convert the amplified signal into an I-Path signal of a baseband signal to be output, a gain of the first mixer being controlled by the RSSI data;
   a second mixer for mixing the amplified received signal, which is amplified by the amplifier, with a second local oscillating signal, which has a phase contrast of 90° to the I-Path signal, and outputs a Q-Path signal, which has a phase contrast of 90° to the I-Path signal and is converted into a signal of a baseband, a gain of the second mixer being controlled by the RSSI data and being the same gain as for the first mixer;
   a first filter and a second filter for removing interfering components of the I-Path signal and Q-Path signal; and
   a RSSI circuit for generating a thermal meter code of $2^{n+1}$ using the I-Path signal and the Q-Path signal, for converting the generated thermal meter codes into a binary code of (n+1) bits, and for generating the binary code as the RSSI data.

16. The receiving device of claim 15, wherein the first filter and the second filter are a band pass filter or a low pass filter.

17. The receiving device of claim 15, wherein the amplifier is a low noise amplifier which minimizes noises occurring when the received signal is amplified.

18. The receiving device of claim 15, wherein the RSSI circuit comprises:
   an I-Path amplifying unit which includes a plurality of amplifiers connected in series for amplifying an inputted I-Path signal through multiple stages;
   an I-Path thermal code generating unit for generating a thermal meter code of $2^n$ bits by using a pair of output signals that are outputted from each of the amplifiers of the I-Path amplifying unit and have an inversed phase to each other;
   a Q-Path amplifying unit which includes a plurality of amplifiers connected in series for amplifying an inputted Q-Path signal, which has a phase contrast of 90° to the I-Path signal, through multiple stages;
   a Q-Path thermal code generating unit for generating a thermal meter code of $2^n$ bits by using a pair of output signals that are outputted from each of the amplifiers of the Q-Path amplifying unit and have an inversed phase to each other; and
   a binary code converting unit for combining the thermal meter codes of $2^n$ bits of the I-Path code generating unit and the thermal meter codes of $2^n$ bits of the Q-Path code generating unit, generating a thermal meter code of $2^{n+1}$ bits,
   converting the thermal mete code of $2^{n+1}$ bits into a binary code of (n+1) bits, and outputting the binary code as digital RSSI data for controlling the gain of the received signal.

19. The receiving device of claim 18, wherein the I-Path thermal code generating unit comprises a plurality of code generators which correspond to each pair of signals outputted from each of the amplifiers of the I-Path amplifying unit and generate thermal meter code of m bits (<n) by inputting corresponding pair of output signals, and wherein the Q-Path thermal code generating unit comprises a plurality of code generators which correspond to each pair of signals outputted from each of the Q-Path amplifiers of the amplifying unit and generate thermal meter codes of m bits (<n) by inputting corresponding pair of output signals.

20. The receiving device of claim 19, wherein each of the code generators of the I-Path thermal code generating unit and the Q-Path thermal code generating unit comprises:
   a comparison signal generating unit for generating comparison voltage signals which are to be compared with the corresponding pair of output signals and have first through $m^{th}$ DC voltage differences with respect to the corresponding pair of output signals; and
   m number of thermal code generators which correspond to each of the comparison voltage signal and generate a thermal code of n-bits by comparing a corresponding comparison voltage signal with the one of the corresponding pair of output signals.

21. The receiving device of claim 20, wherein the comparison signal generating unit comprises:
   a first transistor and a second transistor which include a base, which is connected to each output signal of the corresponding pair of output signals, and a collector, which is connected to a supply voltage;
   a first array of resistors and a second array of resistors which have one end connected to emitters of the first transistor and the second transistor, respectively; and
   a first current source and a second current source which are respectively connected between the other end of the first and the second arrays of resistors and a ground voltage,
   wherein the output signal is obtained from the emitter of the first transistor, and the m number of comparison voltage signals are obtained from the second array of resistors.

22. The receiving device of claim 20, wherein each of the thermal code generators comprises:
   a comparator for comparing a voltage difference between the output signal, which is one of the corresponding pair of output signals, and the corresponding comparison voltage signal and outputs a comparison result as a clock signal; and
   a flip-flop unit which is reset according to a reset signal, receives input data of a high logic level, and latches the input data at the high level as the thermal meter code of n bits in response to the clock signal.

23. A receiving device of a communication system comprising:
   an amplifier which inputs a received signal and amplifies the received signal with a gain which is controlled by RSSI data;
   a mixer for mixing the amplified signal, which is amplified by the amplifier, with a first local oscillating signal to convert the amplified signal into a signal of a baseband, a gain of the mixer being controlled by the RSSI data;
   a filter for removing interfering components of the inputted mixed signal; and
   an RSSI circuit for generating a thermal meter code of $2^n$ using the mixed signal, which interfering components are removed, converting the generated thermal meter code into a binary code of n bits, and generating the binary code as the RSSI data.

24. The receiving device of claim 23, wherein the RSSI circuit comprises:
- an amplifying unit which includes a plurality of amplifiers connected in series and amplifies the received signal through multiple stages;
- a thermal code generating unit for generating a thermal meter code of $2^n$ bits by using a pair of output signals that are outputted from each of the amplifiers of the amplifying unit and have an inversed phase to each other; and
- a binary code converting unit for converting the thermal meter code of $2^n$ bits into a binary code of n+1 bits and outputting the binary code as digital RSSI data for controlling the gain of the received signal.

25. The receiving device of claim 24, wherein the thermal code generating unit includes a plurality of code generators which correspond to each of the pair of output signals and generate a thermal meter code of m bits (<n) when the corresponding pair of output signals are inputted.

26. The receiving device of claim 25, wherein each of the code generators comprises:
- a comparison signal generating unit for generating comparison voltage signals which are to be compared with the corresponding pair of output signals and have first through $m^{th}$ DC voltage differences with respect to the corresponding pair of output signals; and
- m number of thermal code generators which correspond to each of the comparison voltage signals and generate a thermal code of n-bits by comparing a corresponding comparison voltage signal with the one of the corresponding pair of output signals.

27. The receiving device of claim 26, wherein the comparison signal generating unit comprises:
- a first transistor and a second transistor which include a base, which is connected to each output signal of the corresponding pair of output signals, and a collector, which is connected to a supply voltage;
- a first array of resistors and a second array of resistors which have one end connected to emitters of the first transistor and the second transistor, respectively; and
- a first current source and a second current source which are respectively connected between the other end of the first and the second arrays of resistors and a ground voltage,
- wherein the output signal is obtained from the emitter of the first transistor, and the m number of comparison voltage signals are obtained from the second array of resistors.

28. The receiving device of claim 26, wherein each of the thermal code generators comprises:
- a comparator for comparing a voltage difference between the output signal, which is one of the corresponding pair of output signals, and the corresponding comparison voltage signal and outputs a comparison result as a clock signal; and
- a flip-flop unit which is reset according to a reset signal, receives input data of a high logic level, and latches the input data as the thermal meter code of n bits in response to the clock signal.

* * * * *